Patented Oct. 27, 1925.

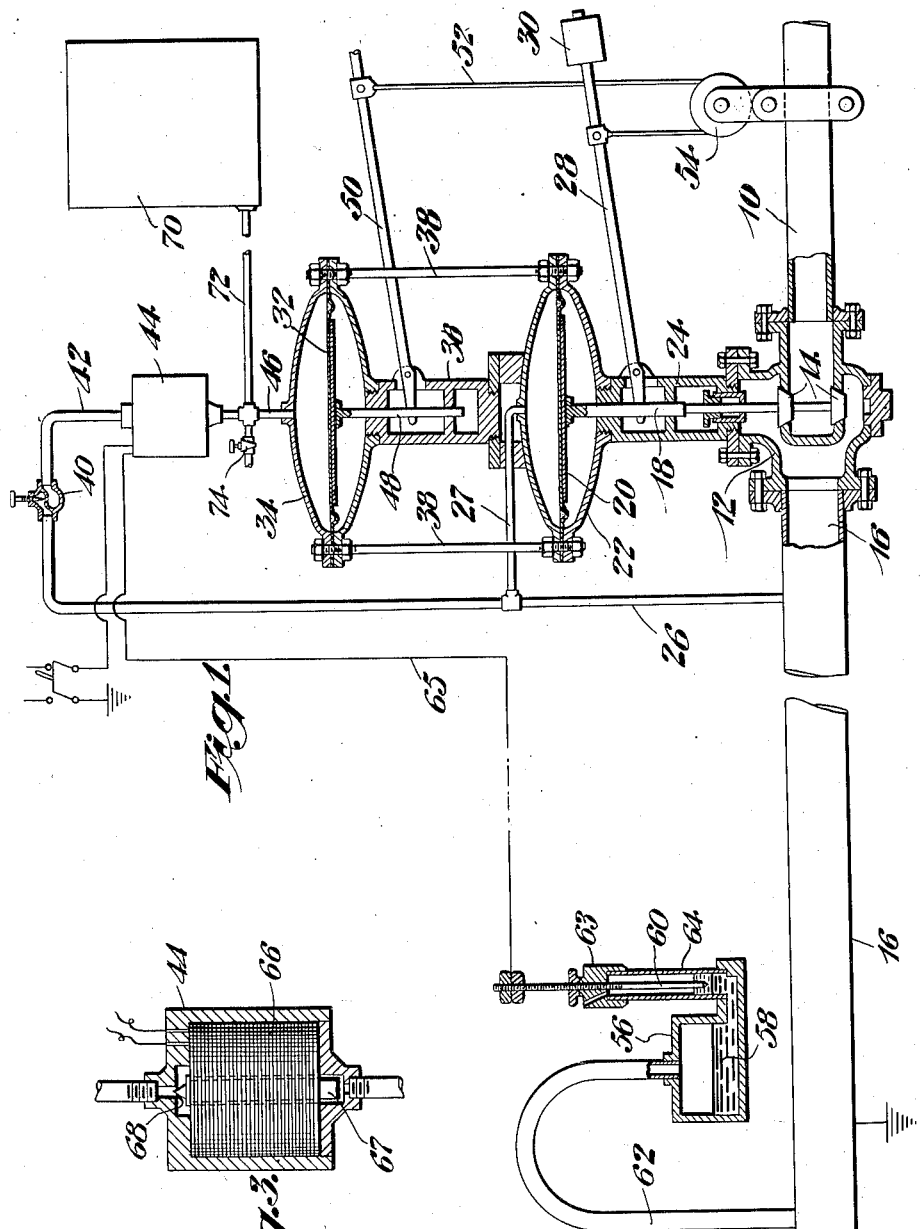

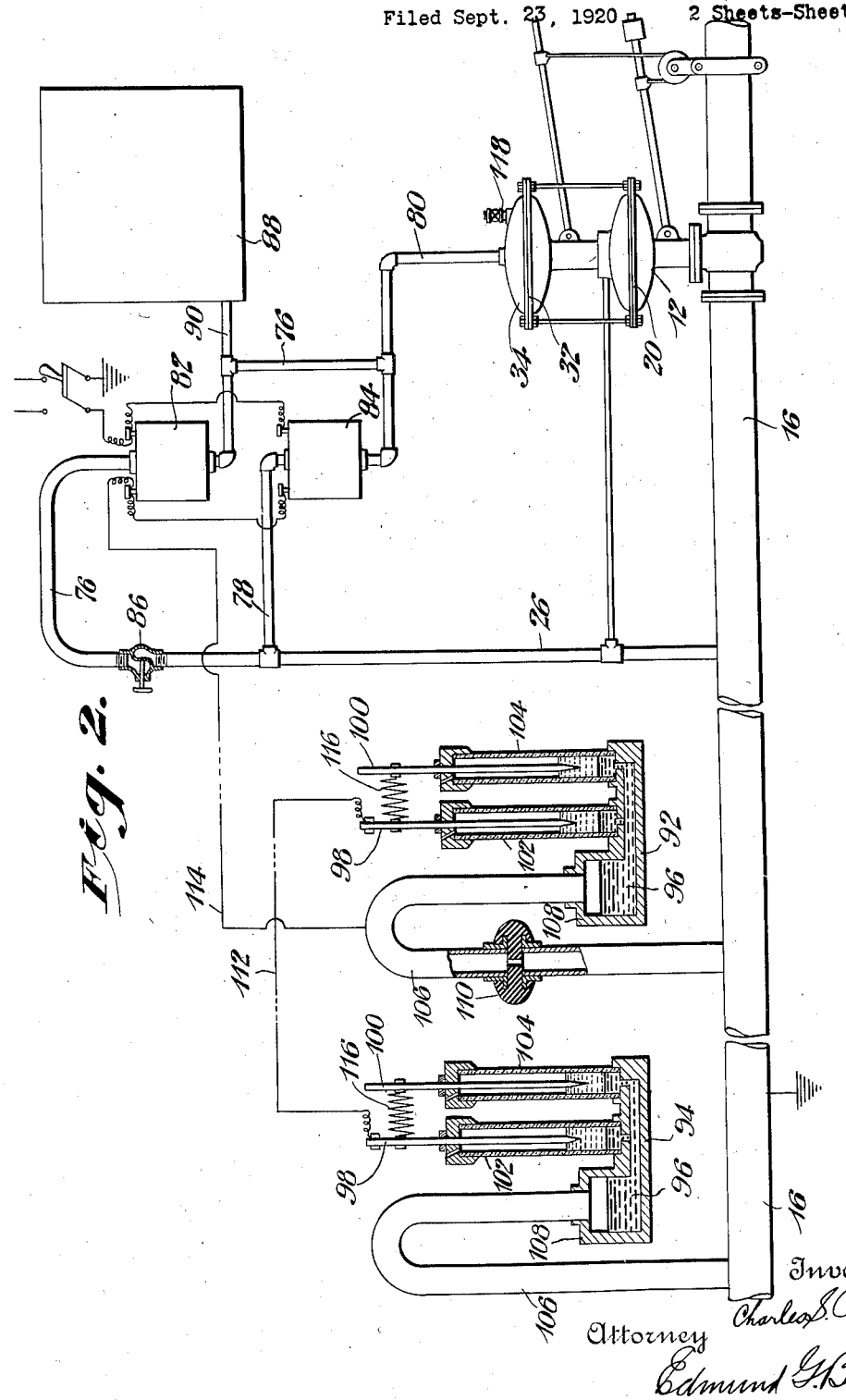

1,558,757

UNITED STATES PATENT OFFICE.

CHARLES S. REED, OF NEW YORK, N. Y., ASSIGNOR, BY MESNE ASSIGNMENTS, TO DOHERTY RESEARCH COMPANY, OF NEW YORK, N. Y., A CORPORATION OF DELAWARE.

VARIABLE-PRESSURE GAS REGULATOR.

Application filed September 23, 1920. Serial No. 412,416.

*To all whom it may concern:*

Be it known that I, CHARLES S. REED, residing at New York city, in the county of New York, State of New York, have invented certain new and useful Improvements in Variable-Pressure Gas Regulators; and I do hereby declare the following to be a full, clear, and exact description of the invention, such as will enable others skilled in the art to which it appertains to make and use the same.

This invention relates to a method of and apparatus for regulating pressure in a gas-distributing system and more particularly to a method of and apparatus for automatically varying the pressure in a gas-distributing line in accordance with the gas demand.

In order to provide a more uniform and regular distribution of gas, many gas-distributing systems are provided with constant pressure regulators. These regulators take care of all of the variations of the pressure of the gas from the source of supply and deliver a substantially uniform gas pressure to the distribution line. To make adequate provision for a gas consumption at the end of the distributing line or at the point of lowest pressure in the distributing system, it is customary to maintain a pressure at the regulator which will give a predetermined minimum pressure at the end of the line when the gas consumption on the distributing system is the greatest. The difference between the pressure at the regulator and the pressure at the end of the line is the greatest, therefore, at the time of maximum gas consumption and this pressure difference is practically zero when no gas is being consumed from the system. When substantially no gas is being consumed in the system, the gas pressure builds up to the maximum pressure of the regulator throughout the entire distributing system. If the maximum regulator pressure is very low, this form of regulation is quite satisfactory. However, if this maximum regulator pressure is high, the form of regulation is unsatisfactory because with a high regulator pressure existing throughout the distributing system, the leakage losses are very high.

The primary object of the present invention is to provide a method of regulating pressure in a gas-distributing system by which a predetermined pressure may be maintained at the low pressure end of a system while maintaining the minimum pressure at the regulator compatible with the gas consumption.

Another object of the invention is to provide a method of controlling the pressure in a gas-distributing system by which high pressure may be used in the system with a minimum waste of gas from leakage.

Another object of the invention is to provide a pressure-regulating apparatus by which a predetermined pressure may be maintained at the low pressure end of a distributing system while maintaining the minimum pressure at the regulator which will provide for a varying gas demand.

Another object of the invention is to provide a pressure regulating apparatus by which an increasing or decreasing gas pressure will be maintained at the regulator in accordance with the increasing or decreasing demand for gas while maintaining a definite gas pressure at a point of lowest pressure in the distributing system distant from the regulator.

With these and other objects in view, the invention consists in the improved method of and apparatus for regulating pressures in a gas-distributing system hereinafter described and defined in the following claims.

The various features of the invention are illustrated in the accompanying drawings, in which, Figure 1 is a view in elevation, partly in section, of a pressure-regulating apparatus for a gas-distributing system embodying the preferred form of the invention;

Fig. 2 is a modified form of the pressure regulating apparatus illustrated in Fig. 1; and Fig. 3 is a detail view in vertical section of a magnetically operated valve which is employed in the fluid pressure line of the compensating regulator diaphragm.

The method of regulating pressure in a gas-distributing system, embodying the preferred form of the invention may be applied to the entire distributing system of a small city or may be applied to the regulation of a predetermined district of a distributing system and used in conjunction with a similar or different method of regulation covering other districts. The pressure regulation is accomplished by means of a main regulating valve which is constructed to normally maintain a constant pressure on its outlet side. The operation of the main constant pressure regulating valve, however, is modified to produce an increasing pressure as the demand increases and a decreasing pressure as the demand decreases, while holding a constant pressure at the end of the line. The gas pressure may build up to any desired amount in supplying the maximum demand, but at this time the consumers on the distributing line are using the gas so rapidly that although the pressure may be high at the regulator, the leakage losses will be comparatively low due to the rapid flow of the gas through the distributing system. When only a small amount of gas is being drawn from the distributing system, the regulator supplies gas at a constant pressure on its outlet side. This constant pressure is only slightly greater than the minimum pressure which is maintained at the end of the line so that with no demand on the line, a low pressure is maintained throughout the system and the leakage loss is very low.

To carry out the method of gas distribution outlined above in the apparatus illustrated in Fig. 1 of the drawings, gas from the source of supply is led in through a conduit 10 to a main regulating valve 12. The gas passes from the conduit 10 through a double poppet valve 14 into the low pressure side of the valve from which it flows into a conduit 16 comprising one portion of a gas distributing system. The regulating valve 12 consists of the usual form of valve which is commonly used for supplying gas at a constant pressure to a distributing system. The double poppet valve 14 is connected by means of a stem 18 with a main regulating diaphragm 20 positioned in a diaphragm chamber 22 which is mounted on a hollow post 24 secured to the upper portion of the casing of the valve 12. Gas from the outlet side of the valve is conducted from the conduit 16 through pipes 26 and 27 to the upper portion of the diaphragm chamber 22 and tends to close the poppet valves 14. The poppet valve 14 is normally held in open position by means of a weighted lever 28 which is pivoted to the post 24 with its inner end pivotally secured to the stem 18 and its outer end provided with an adjustable weight 30. The weight 30 is normally adjusted to allow the gas pressure above the diaphragm 20 to close the valve when a predetermined maximum pressure has been reached at the outlet side of the valve.

To modify the constant pressure regulation of the valve 12 to maintain a constant pressure at the low pressure end of the distributing system while providing an increasing or decreasing pressure in accordance with the gas demand, a compensating pressure operated diaphragm is used to modify the action of the regulating diaphragm 20.

The compensating diaphragm 32 is mounted in a diaphragm chamber 34 which is held in position by means of a post 36 and rods 38 secured to the diaphragm chamber 22. The diaphragm 32 may be operated by a gas pressure from any desirable source and for purposes of convenience, gas from the pipe 26 is led through a needle valve 40 into a pipe 42 connected with a magnetically operated valve 44. The gas passing through the valve 44 flows through a pipe 46 into the upper portion of the valve chamber 34. The gas pressure normally used above the diaphragm 32 does not necessarily have any definite relation to the gas pressure existing at the outlet side of the regulating valve 12 but is controlled by the needle valve 40 to cause the regulating valve to develop a definite maximum pressure on its outlet side which will provide a sufficient supply of gas at maximum demand. The movement imparted to the diaphragm 32 by the gas pressure is conveyed by means of a stem 48 to the inner end of a lever 50 pivotally mounted in the post 36. The outer end of the lever 50 is connected by means of a flexible cable 52 with the regulating valve lever 28. The cable 52 passes around a pulley 54 mounted on the conduit 10 between its connections with the levers 50 and 28 so that any movement of the diaphragm 32 tends to produce a movement of the diaphragm 20 in the opposite direction. This connection between the levers 50 and 28 has the effect of an automatic adjustment of the weight 30 upon the lever 28 to automatically vary the pressure which may be developed in the outlet side of the main regulating valve 12 to increase or decrease the pressure as the gas demand varies. The component of the force exerted by the diaphragm 32 may be varied by shifting the points of connection of the cable 52 on the levers 50 and 28.

The pressure at the end of the distributing line or at some point on the distributing line distant from the regulating valve where the lowest pressure is maintained, is controlled by a pressure-responsive electric switch 56 which operates the magnetic valve 44. The electric switch 56 consists of a manometer filled with mercury 58 with a contact rod 60 in one leg of the manometer and a tube 62 connecting the other leg of the manometer with a distributing conduit 16. The contact rod 60 is carried by a support 63 which is insulated from the base of the manometer by means of a glass tube 64. Mineral oil is placed in the glass tube 64 above the mercury to prevent sparking and to prevent the mercury from hanging to the contact point of the rod 60. The pressure in the conduit 16 is communicated to the mercury in the manometer through the tube 62 and as the pressure rises and falls the mercury will be moved toward and from the contact rod 60. At the time the pressure in the conduit 16 at the position of the switch 56 reaches a predetermined maximum, the mercury 58 will be forced into contact with the rod 60 to close an electric circuit through a conductor 65 connected between the rod 60 and a solenoid 66 mounted in the valve 44. The circuit from the rod 60 and through the solenoid 66 is completed by leading one terminal of the solenoid to the ground and by grounding the conduit 16. At the time the mercury 58 comes into contact with the rod 60, an armature 67 within the solenoid 66 will be moved upwardly against a valve seat 68 to close the valve 44 and thereby shut off the fluid pressure from the diaphragm 32. When the pressure in the distribution line 16 decreases sufficiently to permit the mercury 58 in the switch 56 to fall below the end of the rod 60, the electric circuit will be broken and the armature 67 will fall by gravity to open the valve 44.

The pressure-responsive switch 56 may be located at a comparatively long distance from the regulating valve 12 and the distributing system may hold a very large volume of gas, especially when it is placed under pressure. It is desirable, therefore, that the regulating valve 12 should not operate abruptly in changing the pressure because such operation would give a fluctuating pressure in the distributing lines. To effect a gradual and slow changing regulation, the gas from the line 26 flows slowly through the valve 40 and slowly builds up the pressure over the diaphragm 32 to provide an increasing pressure at the regulator to develop the desired maximum pressure at the end of the line and to supply an increasing demand for gas. The velocity with which the gas pressure is built up over the diaphragm 32 is further retarded or dampened by means of a storage receptacle 70 which is connected with pipe 46 by a pipe 72. This requires that the maximum pressure which is delivered through the needle valve 40 must be built up in the receptacle 70 as well as in the upper portion of the diaphragm chamber 34. While the pressure is building up to the maximum in the diaphragm chamber 34 and receptacle 70, the component of the force exerted by the diaphragm 32 upon the regulating valve lever 28 will gradually increase to develop a gradually increasing pressure at the outlet side of the valve. This pressure will increase until the maximum pressure delivered by the needle valve 40 is reached over the diaphragm 32 at which time the component of the force exerted by the diaphragm 32 will be constant and the regulating valve 12 will then act as a constant pressure regulator for delivering gas at a constant maximum pressure to meet the maximum demand.

When the pressure at the end of the line reaches the desired maximum, or when the demand on the line begins to fall off to produce the maximum pressure at the end of the line, it is desirable that the pressure delivered by the regulating valve shall gradually decrease in the same way that the pressure is gradually increased. To gradually decrease the pressure delivered by the regulator, the magnetic valve 44 is closed by the switch 56 and a valve 74 positioned in the pipe 72 is set to allow a small amount of leakage to gradually decrease the pressure in the diaphragm chamber 34 and receptacle 70. The leakage through the valve is comparatively small so as to gradually decrease the pressure on the diaphragm 32. While this pressure is decreasing, the component of the force exerted by the diaphragm 32 will gradually decrease to cause the regulating valve to deliver a gradual decreasing pressure at its outlet side. The lower portion of the diaphragm 32 is under atmospheric pressure and after a predetermined time period, which, for example, may be thirty minutes, the pressure exerted above the diaphragm 32 will be atmospheric. At this time the diaphragm 32 will not exert any force upon the regulating lever 28 and the regulating valve 12 will act as a constant pressure regulator to deliver a predetermined minimum pressure. This pressure will depend upon the position of the weight 30 on the lever 28 and the connection of the lever 50 with the lever 28 by means of the cable 52. These parts are so adjusted that they will cause the regulating valve 12 to deliver the minimum pressure which will be required to establish the desired maximum pressure at the switch 56. The predetermined minimum pressure delivered by the regulating valve 12 will normally be in effect during the time of low demand and this regulating system, therefore, will maintain a minimum pressure in the line to prevent losses of gas from leakage. If for any reason the magnetically operated valve or the electric switch 56 should get out of order, the regulator 12 would not be inoperative but will act as a constant pressure regulator to deliver the maximum demand pressure in the same way that the ordinary constant pressure regulators are operative.

The leakage through the valve 74 is constant and extremely small and is regulated so that it will take a comparatively long time for a very small amount of gas to escape from the diaphragm chamber when the valve 44 is closed. Although it is desirable to provide a valve by which the speed of the leakage of gas from the diaphragm chamber may be modified, it has been found in actual practice that the natural leakage of gas through the diaphragm 32 and through the joint between the sections of the diaphragm chamber is sufficient to give an effective regulating action of the diaphragm 32 when the valve 74 is closed tightly. Therefore, it is practical to operate the compensating diaphragm without the use of any special regulating valve such as 74.

The modified form of pressure regulating apparatus illustrated in Fig. 2 will provide a more sensitive and accurate regulation than is normally possible with apparatus shown in Fig. 1. As illustrated in the drawings, the pressure over the compensating diaphragm 32 is controlled by two magnetically operated valves which are operated selectively to gradually or rapidly increase or decrease the pressure over the compensating diaphragm, in accordance with whether the pressure at a remote point on the line decreases or increases gradually or rapidly. The magnetically operated valves are preferably operated by a plurality of switches which are connected in series and located at low pressure points in different sections of the distributing lines, and so arranged that the magnetically operated valves will not function until the pressure at all of the remote points has reached the desired maximum.

In the apparatus shown in Fig. 2 the main regulating valve, the regulating diaphragm 20, and the compensating diaphragm 32, have the same construction and arrangement as that shown in Fig. 1. Gas under pressure for operating the compensating diaphragm 32 is derived from the pipe 26, and flows through lines 76 and 78, both of which connect with a line 80 connecting with the upper part of the compensating diaphragm casing 34. Regulating valves 82 and 84 are mounted respectively in lines 76 and 78 for controlling the flow of gas through those lines. The valves 82 and 84 are connected in an electric circuit in parallel, the valve 84 being provided with a low voltage solenoid, and valve 82 being provided with a high voltage solenoid, whereby the valves may be operated independently and selectively. The flow of gas through the line 76 is restricted by a needle valve 86, so that when the magnetic valve 82 is opened, the pressure over the diaphragm 32 will be gradually built up. The pipe 78, on the other hand, will permit the full flow of gas from the pipe 26 to the diaphragm 32, so that when the valve 84 is opened, the pressure over the diaphragm 32 will be rapidly built up. A storage receptacle 88 is connected by means of a pipe 90 with the line 76, so that both of the valves 82 and 84 operate in conjunction with the storage receptacle, whereby the speed with which the pressure is built up over the diaphragm 32 will be dampened or retarded.

The magnetically operated valves 82 and 84 have the same construction as that illustrated in Fig. 3. These valves are operated by means of electric switches 92 and 94. The switches 92 and 94 are preferably located at different points of low pressure in the distributing system and are connected in series whereby the electric circuit for operating the valves 82 and 84 will not be made until the contacts in both switches have been closed, and the circuit for opening the valves 82 and 84 will be broken when the contact in either switch is broken. Accordingly, if one switch gets out of order, the electric circuit for operating the valves 82 and 84 will not be made and therefore the regulator will deliver a predetermined maximum pressure.

As shown in Fig. 2, switches 92 and 94 consist of manometers filled with mercury 96, having contact rods 98 and 100 mounted respectively in manometer legs 102 and 104, and pipes 106 connected between conduit 16 and a manometer leg 108. The conduit 16 is grounded and the electric current in the switch 94 flows from one or both of the rods 98 and 100 through the mercury 96 and pipe 106 to the conduit 16. In order to connect the switches 92 and 94 in series, the switch 92 is insulated from the conduit 16 by means of an insulating block 110 mounted in the pipe 106. The rods 98 of the switches are connected by a conductor 112 and the pipe 106 of the switch 92 is connected by a conductor 114, leading to the magnetically operated valve 82. The contact rods 100 project downwardly toward the mercury level in the manometers a greater distance than the contact rods 98, and therefore when the mercury 96 is forced upwardly in to the legs 102 and 104, contact between the mercury and rods 100 will be made before the contact is made between the mercury and rods 98. The rods 98 are connected with rods 100 by a high resistance wire 116, so that when the current flows from the rod 100 to the rod 98, the voltage of the current will be materially reduced. If the gas pressure in the conduit 16 is brought to such a point that it forces the mercury 96 only into contact with the rods 100, the current will then flow from a source of power through the solenoids in the valves 82 and 84, then through the conductor 114, thence through pipe 106, mercury 96, rod 100, and resistance wire 116 of switch 92, then through line 112 connecting the rods 98, thence through resistance wire 116, rod 100, mercury 96, and pipe 106, of switch 94, thence through conduit 16 and to the ground. In passing through the resistances 116 the voltage of the current will be reduced to such an extent that it will not operate the armature within the electrically operated valve 82. This reduced voltage current, however, will operate the armature in the electrically operated valve 84 and close the valve to shut off the flow of gas from the line 78 to the compensating diaphragm 32. If the pressure in gas lines continues to rise to force the mercury 96 in the switches 92 and 94 into contact with the rods 98, the full voltage current will then flow through the circuit described above to operate both armatures within the valves 82 and 84. When the armatures of the valves 82 and 84 are operated, they shut off the flow of gas through the line 76 and 78 and thus cut off the pressure from the diaphragm 32. With the valve 84 closed and valve 82 opened, the restricted flow of gas through the needle valve 86 to the diaphragm 32 will not maintain the maximum pressure over the diaphragm, but the pressure will be gradually decreased, due to continuous leakage of the gas from the diaphragm chamber 34 through a valve 118. At the time both valves 82 and 84 are closed, the pressure over the diaphragm 32 is quickly reduced to atmospheric due to leakage through the valve 118. This leakage may also occur through the diaphragm 32, and joint in the valve casing 12, so that the regulator will operate without the valve 118. When the pressure falls in the conduit 16 below a predetermined minimum, the contact between the mercury 96 in the switches, and rods 98 will be broken before the contact between the mercury and rods 100 is broken. Therefore, the magnetically operated valve 82 will be opened before the magnetically operated valve 84. With the valve 82 opened and valve 84 closed, gas under restricted flow enters the diaphragm chamber 32 to gradually build up the pressure therein. If the pressure in distributing lines falls gradually, the valve 82 will provide for most of the regulation of the pressure over the diphragm 32. However, if the pressure in the distributing lines falls rapidly, both of the valves 82 and 84 will be opened by the mercury 96 in the switches 92 and 94 falling below the ends of the rods 98 and 100, thus admitting the full flow of gas from the pipe 26 through the lines 76 and 78 to rapidly build up the pressure over the diaphragm 32.

In view of the above construction it will be seen that depending upon whether one or both of the valves 82 or 84 are opened, the pressure will gradually or rapidly build up over the diaphragm 32, to cause the regulated valve to act as a pressure increaser. At the time both of the valves 82 and 84 are opened, the pressure is built up rapidly over the diaphragm 32 to the maximum pressure delivered by the line 26, and the regulating valve will then act as a constant pressure regulator for delivering the maximum pressure to the conduit 16. On the other hand, when one or both of the valves 82 and 84 are closed, the pressure over the diaphragm 32 will gradually or rapidly decrease by leakage through the valve 118. When the pressure on the diaphragm 32 is decreasing, the regulating valve 12 will act to decrease pressure until the pressure above the diaphragm 32 becomes equal to the pressure below the diaphragm. At this time the regulating valve will act as a constant pressure regulator to deliver the minimum gas pressure which will be required for maintaining the desired maximum pressure at the remote points on the distributing line, or the positions of the switches 92 and 94. It will be apparent, therefore, that the regulation obtained by the apparatus shown in Fig. 2 involves the same principle of regulation as the apparatus shown in Fig. 1, but the apparatus shown in Fig. 2 will give a more accurate and more quickly responsive pressure regulation in accordance with the changes in pressure at the remote ends of the distributing lines.

While the use of two of the multipole switches 92 and 94 connected in series has been described, it is obvious that one multipole or single pole switch alone may be used for this regulation, or more than two multipole or single pole switches connected in the series may be used for this regulation.

The preferred form of the invention having been thus described, what is claimed as new is:

1. A method of regulating gas pressure in distributing lines, comprising admitting gas to said lines through a regulating valve, controlling said valve in accordance with the pressure on the outlet side therof to maintain a substantially constant pressure on said outlet side. and utilizing the motive force of the gas adjacent said valve to modify the action of said valve control in accordance with pressure existing at a point in the lines distant from said valve where approximately the lowest pressure is to be maintained.

2. A method of regulating gas pressure in distributing lines, comprising admitting gas to said lines through a regulating valve, controlling said valve in accordance with the pressure on the outlet side therof to maintain a substantially constant pressure on said outlet side, modifying the action of said valve to provide an increasing or decreasing pressure at the outlet side therof as the gas demand increases or decreases, said modifying action of said valve being produced by the motive force of the gas at a point adjacent said valve when the pressure of the gas at a given point remote from the said valve falls to a predetermined pressure.

3. A method of regulating gas pressure in distributing lines, comprising admitting gas to said lines through a regulating valve, automatically operating said valve to deliver a constant maximum pressure at the outlet side thereof or a constant minimum pressure at the outlet side thereof, modifying the constant pressure delivery of said valve by the motive force of the gas at a point adjacent to said valve to provide an increasing or decreasing pressure between said maximum limits at the outlet side thereof as the gas demand increases and decreases, said modifying action being controlled by the variations in pressure from a predetermined maximum existing in the lines at a point distant from said valve where approximately the lowest pressure is to be maintained.

4. A method of regulating gas pressure in distributing lines, comprising admitting gas to said lines through a regulating valve, controlling said valve in accordance with the pressure on the outlet side thereof to maintain a substantially constant pressure on said outlet side, modifying the action of said valve control by the motive force of the gas at a point adjacent said valve and in accordance with the pressure at a point in the line distant from said valve where approximately the lowest pressure exists, and dampening the modifying operation to prevent abrupt closing and opening movements of the valve.

5. A pressure regulator, comprising a valve mounted in a conduit, means for operating said valve to maintain a constant pressure at the outlet side thereof, a pressure responsive device mounted in the conduit extending from the outlet side of the valve at a point of low pressure and distant therefrom, and means controlled by said device to vary the operation of said valve-operating means to maintain a substantially constant pressure in the conduit at said device.

6. A pressure regulator, comprising a valve mounted in a conduit, means for operating said valve to maintain a constant pressure at the outlet side thereof, a pressure-correcting means connected with said valve-operating means, a pressure-responsive device mounted in the conduit extending from the outlet side of the valve at a point of low pressure and distant therefrom, connections between said correcting means and said device arranged to operate the valve to maintain a substantially constant pressure in the conduit at said device, and means for dampening the operation of said correcting means.

7. A pressure regulator, comprising a valve mounted in a conduit, a diaphragm connected with said valve, a connection forming communication between said diaphragm and the outlet side of said valve, a pressure-responsive device mounted in said conduit on the outlet side of said valve at a point of low pressure distant therefrom, a pressure-operated compensating diaphragm controlled by said device, and operative connections between said compensating and valve diaphragms.

8. A pressure regulator, comprising a valve mounted in a conduit, a diaphragm connected with said valve, a connection forming communication between said diaphragm and the outlet side of said valve, the pressure communicated to said diaphragm tending to normally close said valve, means operating on said valve to normally open the same against the influence of said diaphragm, a pressure-responsive device mounted in said conduit on the outlet side of said valve at a point of lowest pressure distant therefrom, a pressure-operated compensating diaphragm controlled by said device, and connections between said compensating diaphragm and said valve-opening means arranged to vary the effect of said valve-opening means.

9. A pressure regulator, comprising a valve mounted in a conduit, a diaphragm connected with said valve, a connection forming communication between said diaphragm and the outlet side of said valve, a pressure-responsive device mounted in said conduit on the outlet side of said valve at a point of low pressure distant therefrom, a compensating diaphragm connected with said valve diaphragm, fluid pressure means for operating said compensating diaphragm, a valve for controlling said fluid pressure, and means operated by said device for controlling said fluid pressure valve.

10. A pressure regulator, comprising a valve mounted in a conduit, a diaphragm mounted in a pressure chamber and connected with said valve, a connection forming communication between said diaphragm chamber and the outlet side of said valve, a pressure-responsive device mounted in said conduit on the outlet side of said valve at a point of low pressure distant therefrom, a compensating diaphragm mounted in a pressure chamber and connected with said valve diaphragm, fluid pressure means for operating said compensating diaphragm, a valve controlling said fluid pressure, means operated by said device for controlling said fluid pressure valve, and means for relieving the fluid pressure in said compensating diaphragm chamber.

11. A pressure regulator, comprising a valve mounted in a conduit, a diaphragm mounted in the pressure chamber and connected with said valve, a connection providing communication between said diaphragm and the outlet side of said valve, a pressure-responsive device mounted in said conduit on the outlet side of said valve at a point of low pressure distant from said valve, a compensating diaphragm mounted in a chamber and connected with said valve diaphragm, fluid pressure means for operating said compensating diaphragm, a valve for controlling the fluid pressure in said compensating diaphragm chamber, means for releasing the fluid pressure in said compensating diaphragm chamber, and a storage receptacle connected with said compensating diaphragm chamber to dampen the velocity of changes of pressure in said chamber.

12. A pressure regulator, comprising a regulating valve mounted in a conduit, a diaphragm connected with said regulating valve, a connection providing communication between said diaphragm and the outlet side of said regulating valve, a compensating diaphragm connected with said regulating valve diaphragm, a fluid pressure connection for operating said compensating diaphragm, a magnetically operated valve in said fluid pressure line, a pressure-responsive electric switch mounted in said conduit on the outlet side of said valve at a low pressure point distant from said regulating valve, and an electrical power circuit between said switch and said magnetic valve.

13. A pressure regulator, comprising a regulating valve mounted in a conduit, a diaphragm connected with said regulating valve, a connection providing communication between said diaphragm and the outlet side of said regulating valve, a compensating diaphragm connected with said regulating valve diaphragm, a fluid pressure connection for operating said compensating diaphragm, a magnetically operated valve in said fluid pressure line, a storage receptacle connected to said fluid pressure line on the outlet side of said magnetic valve, a pressure-responsive electric switch mounted in the outlet side of said conduit at a low pressure point distant from said regulating valve, and an electrical power circuit between said switch and said magnetic valve.

14. A pressure regulator, comprising a regulating valve mounted in a conduit, a diaphragm mounted in a pressure chamber and connected to said valve, a compensating diaphragm mounted in a pressure chamber, connections between said diaphragms arranged to simultaneously move them in opposite directions, a connection between the outlet side of said valve and said diaphragm chamber, a fluid pressure connection with said compensating diaphragm chamber, and means for controlling said fluid pressure to gradually increase or decrease the pressure in said compensating diaphragm chamber in accordance with the variations in pressure in the conduit extending from the outlet side of said regulating valve at a low pressure point distant therefrom.

15. A pressure regulator, comprising a regulating valve mounted in a conduit, a diaphargm connected to said valve, a connection providing communication between said diaphragm and the outlet side of said valve, a compensating diaphragm connected to said valve diaphragm, a fluid pressure means for operating said compensating diaphragm, a plurality of magnetically operated valves separately mounted in said fluid pressure line, a multi-pole pressure responsive switch mounted in the conduit at the outlet side of said valve at a point distant therefrom, an electric circuit connection between said switch and said magnetic valves, and a voltage reducing connection between the poles of said switch arranged to selectively operate said magnetic valves to modify the pressure on said compensating diaphragm.

16. A pressure regulator, comprising a regulating valve mounted in a conduit, a diaphragm connected to said valve, a connection providing communication between said diaphragm and the outlet side of said valve, a compensating diaphragm connected to said valve diaphragm, a fluid pressure means for operating said compensating diaphragm, a plurality of magnetically operated valves separately mounted in said fluid pressure line, a storage receptacle mounted in the fluid pressure line on the outlet side of said magnetic valves, a multi-pole pressure responsive switch mounted in the conduit at the outlet side of said regulator valve at a point distant therefrom, an electric circuit connection between said switch and said magnetic valves, and a voltage reducing connection between the poles of said switch arranged to selectively operate said magnetic valves to modify the pressure on said compensating diaphragm.

In testimony whereof I affix my signature.

CHARLES S. REED.